(12) United States Patent
Nishioka et al.

(10) Patent No.: US 7,274,552 B2
(45) Date of Patent: Sep. 25, 2007

(54) NIOBIUM FOR CAPACITOR AND CAPACITOR USING SINTERED BODY OF THE NIOBIUM

(75) Inventors: Masaaki Nishioka, Chiba (JP); Kazumi Naito, Chiba (JP); Isao Kabe, Chiba (JP)

(73) Assignee: Showa Denko K.K., Tokyo (JP)

( * ) Notice: Subject to any disclaimer, the term of this patent is extended or adjusted under 35 U.S.C. 154(b) by 320 days.

(21) Appl. No.: 10/471,728

(22) PCT Filed: Mar. 15, 2002

(86) PCT No.: PCT/JP02/02514

§ 371 (c)(1), (2), (4) Date: Sep. 15, 2003

(87) PCT Pub. No.: WO02/075758

PCT Pub. Date: Sep. 26, 2002

(65) Prior Publication Data

US 2004/0079189 A1    Apr. 29, 2004

Related U.S. Application Data

(60) Provisional application No. 60/277,280, filed on Mar. 21, 2001.

(30) Foreign Application Priority Data

Mar. 16, 2001   (JP)   ............... 2001-076880

(51) Int. Cl.
*H01G 9/042*    (2006.01)
(52) U.S. Cl. .................................... 361/528
(58) Field of Classification Search ............... 75/252, 75/245; 361/525, 528
See application file for complete search history.

(56) References Cited

U.S. PATENT DOCUMENTS

| 4,544,403 A | * | 10/1985 | Schiele et al. ............ 420/427 |
| 4,648,010 A | * | 3/1987 | Naitoh et al. ............ 361/525 |
| 4,954,169 A | * | 9/1990 | Behrens .................... 75/228 |
| 6,051,044 A | * | 4/2000 | Fife ........................ 75/229 |
| 6,136,062 A | * | 10/2000 | Loffelholz et al. ............ 75/369 |
| 6,139,592 A | * | 10/2000 | Kamigawa et al. ........ 29/25.03 |
| 6,171,363 B1 | | 1/2001 | Shekhter |
| 6,344,966 B1 | * | 2/2002 | Monden et al. .............. 361/524 |

FOREIGN PATENT DOCUMENTS

| DE | 19847012 | 4/2000 |
| JP | 10-308117 A | 11/1998 |
| WO | 0008662 A1 | 2/2000 |
| WO | 00/49633 | 8/2000 |
| WO | 0046819 A1 | 8/2000 |
| WO | 00/56486 | 9/2000 |
| WO | WO 00/56486 A1 | 9/2000 |
| WO | 0069588 A1 | 11/2000 |

OTHER PUBLICATIONS

International Search Report for PCT/JP02/02514 dated Jun. 25, 2002.
Communication from Chinese Patent Office.
European Search Report dated Mar. 5, 2007.

* cited by examiner

*Primary Examiner*—Roy King
*Assistant Examiner*—Ngoclan T. Mai
(74) *Attorney, Agent, or Firm*—Sughrue Mion Pllc.

(57) ABSTRACT

1. A niobium powder for capacitors, wherein the chromium content is 50 ppm by mass or less, granulated product and sintered body thereof, and producing method of those; 2. a capacitor constructed by one part electrode formed of the niobium sintered body, another part electrode and a dielectric material interposed between two electrodes, and its producing method; and 3. an electronic circuit and electronic device using the capacitor. A capacitor having good voltage resistance properties can be manufactured by using the niobium sintered body for capacitors of the present invention, wherein the chromium content is 50 ppm by mass or less.

28 Claims, No Drawings

NIOBIUM FOR CAPACITOR AND CAPACITOR USING SINTERED BODY OF THE NIOBIUM

CROSS REFERENCE TO THE RELATED APPLICATIONS

This is an application based on the prescription of 35 U.S.C. Section 111(a) with claiming the benefit of filing date of U.S. Provisional application Ser. No. 60/277,280 filed Mar. 21, 2001 under the provision of 35 U.S.C. 111(b), pursuant to 35 U.S.C. Section 119(e) (1).

TECHNICAL FIELD

The present invention relates to niobium (a niobium powder, a niobium-granulated product and a sintered body produced therefrom), which can provide a capacitor having good voltage resistance characteristics and a large capacitance per unit volume, and also relates to a capacitor using the sintered body.

BACKGROUND ART

Capacitors for use in electronic instruments such as portable telephone and personal computer are demanded to have a small size and a large capacitance. Among conventional capacitors, tantalum capacitors are preferred because of their large capacitance for the size and good performance. In these tantalum capacitors, a sintered body of tantalum powder is generally used for the anode moiety. In order to increase the capacitance of the tantalum capacitor, it is necessary to increase the weight of the sintered body or to use a sintered body increased in the surface area by pulverizing the tantalum powder.

The former method of increasing the weight of the sintered body necessarily involves enlargement of the capacitor shape and cannot satisfy the requirement for downsizing. On the other hand, in the latter method of pulverizing the tantalum powder to increase the surface area, the pore size of the tantalum sintered body decreases or closed pores increase at the stage of sintering and therefore, impregnation of the cathode agent in the later process becomes difficult. As one of means for solving these problems, a capacitor using a sintered body of powder of a material having a dielectric constant larger than that of tantalum is being studied. The materials having a larger dielectric constant include niobium.

Niobium is homologous to tantalum but is greatly different from tantalum in the characteristics as the material for capacitors. For example, if tantalum contains 10,000 ppm by mass of oxygen as impurities, the leakage current characteristics are greatly deteriorated, however, niobium has no such a problem and even if niobium has an oxygen content of tens of thousands of ppm by mass, the leakage current characteristics are scarcely deteriorated.

Capacitors manufactured using niobium as a raw material are, however, inferior in the voltage resistance characteristics to capacitors manufactured using tantalum as a raw material.

Known publications describing the relationship between the amount of impurity elements contained in the niobium powder and the capacitor performance include International Patent Publications WO00/49633 and WO00/56486. The former discloses that the capacitor performance such as specific leakage current of the capacitor can be improved by reducing the content of specific impurity elements such as iron, nickel and cobalt, to 100 ppm by mass or less, and the latter discloses that this effect can be attained by adjusting the carbon content to from 40 to 200 ppm by mass and the iron, nickel and chromium content to approximately from 5 to 200 ppm by mass. However, either publication does not disclose the relation between the chromium content and the voltage resistance characteristics of the capacitor.

DISCLOSURE OF THE INVENTION

As a result of extensive investigations on the niobium used as the raw material of the capacitor which is improved in the voltage resistance characteristics, the present inventors have found that a correlation generally exists between the voltage resistance of a capacitor and the content of impurities in the niobium (B, C, F, Na, Mg, Ca, Fe, Ni, Zn, W, Cr and others), particularly between the voltage resistance and the chromium content. And they found that a capacitor using niobium reduced in the chromium content (particularly 50 ppm by mass or less) is remarkably improved in the voltage resistance. This improvement is considered to be attributable to that the deterioration in the vicinity of impurity elements partially present in the dielectric layer of a capacitor is outstanding particularly in the vicinity of chromium element. However, niobium raw materials usually available have a large chromium content and therefore, if the raw material is used as it is, the above-described property cannot be attained. The present inventors have found a method for producing niobium reduced in the chromium content, which is used as a raw material for capacitors having a small size and good voltage resistance characteristics. The present invention has been accomplished based on this finding.

The present invention relates to a niobium for capacitors, a niobium powder, a granulated product and a sintered body thereof, a capacitor using the sintered body, and producing method thereof in below:

1. a niobium for capacitors, mainly comprising niobium characterized in that the chromium content is 50 ppm by mass or less;

2. the niobium for capacitors mainly comprising niobium as described in 1 above, which contains a niobium nitride;

3. the niobium for capacitors mainly comprising niobium as described in 1 above, which contains a niobium carbide;

4. the niobium for capacitors mainly comprising niobium as described in 1 above, which contains a niobium boride;

5. the niobium for capacitors mainly comprising niobium as described in 1 above, which is a powder having an average particle size of 0.1 µm to 3 µm;

6. the niobium for capacitors mainly comprising niobium, as described in 1 above, which is a a niobium-granulated product having an average particle size of 10 µm to 300 µm;

7. the niobium for capacitors mainly comprising niobium as described in 1 above, which is a niobium sintered body having a BET specific surface area of from 0.5 $m^2/g$ to 7 $m^2/g$;

8. a capacitor constructed by one electrode formed of a niobium sintered body mainly comprising niobium, the other electrode and a dielectric material interposed between the two electrodes, wherein the sintered body is a sintered body of the niobium for capacitors described in any one of 1 to 6 above;

9. a capacitor constructed by one electrode formed of a niobium sintered body mainly comprising niobium, the other electrode and a dielectric material interposed between the two electrodes, wherein the sintered body is a sintered body of the niobium for capacitors described in 7 above;

10. the capacitor as described in 8 or 9 above, wherein the main component of the dielectric material constituting the capacitor is a niobium oxide;

11. the capacitor as described in any one of 8 to 10 above, wherein the other electrode is at least one member selected from the group consisting of an electrolytic solution; an organic semiconductor and an inorganic semiconductor;

12. the capacitor as described in 11 above, wherein the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an organic semiconductor mainly comprising an electrically conducting polymer obtained by doping a dopant into a polymer comprising two or more repeating units represented by the following formula (1) or (2):

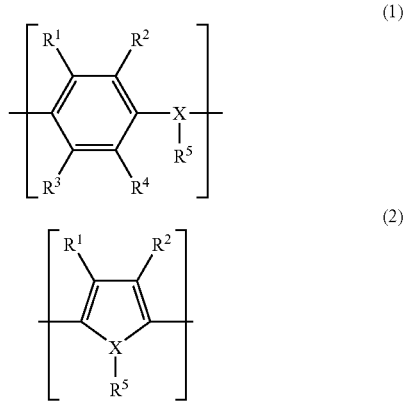

(wherein $R_1$ to $R_4$ each represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains in each of the pairs $R_1$ and $R_2$, and $R_3$ and $R_4$ may combine at an arbitrary position to form a divalent chain for forming at least one 3-, 4-, 5-, 6- or 7-membered saturated or unsaturated hydrocarbon cyclic structure together with the carbon atoms substituted by $R_1$ and $R_2$ or by $R_3$ and $R_4$; the cyclic bonded chain may contain a bond of carbonyl, ether, ester, amide, sulfide, sulfinyl, sulfonyl or imino at an arbitrary position; X represents an oxygen atom, a sulfur atom or a nitrogen atom; $R_5$ is present only when X is a nitrogen atom and each $R_5$ independently represents a hydrogen atom or a linear or branched, saturated or unsaturated alkyl group having from 1 to 10 carbon atoms);

13. the capacitor as described in 12 above, wherein the electrically conducting polymer is an electrically conducting polymer comprising a repeating unit represented by the following formula (3):

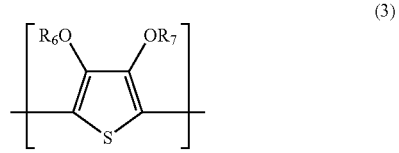

(wherein $R_6$ and $R_7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements resulting from those alkyl groups combining with each other at an arbitrary position, and the cyclic structure includes a structure having a vinylene bond which may be substituted, and a phenylene structure which may be substituted);

14. the capacitor as described in 11 above, wherein the organic semiconductor is at least one member selected from the group consisting of polypyrrole, polythiophene, polyaniline and substitution derivatives thereof;

15. the capacitor as described in 11 above, wherein the organic or inorganic semiconductor has an electrical conductivity of $10^{-2}$ S·cm$^{-1}$ to $10^3$ S·cm$^{-1}$;

16. a method for producing a niobium for capacitors characterized in comprising, in the production process thereof, a step of reducing the chromium content of a substance mainly comprising niobium;

17. the method for producing a niobium for capacitors as described in 16 above, wherein the step of reducing the chromium content is a step of treating a substance mainly comprising niobium with a solution containing at least one acid selected from the group consisting of a hydrofluoric acid, a nitric acid, a sulfuric acid and a hydrochloric acid;

18. the method for producing a niobium for capacitors as described in 16 or 17 above, wherein the substance mainly comprising niobium contains a niobium nitride;

19. the method for producing a niobium for capacitors as described in 16 or 17, wherein the substance mainly comprising niobium contains a niobium carbide;

20. the method for producing a niobium for capacitors as described in 16 or 17 above, wherein the substance mainly comprising niobium contains a niobium boride;

21. the method for producing a niobium for capacitors as described in 16 above, wherein the substance mainly comprising niobium is a powder;

22. the method for producing a niobium for capacitors as described in 21 above, wherein the niobium powder has an average particle size of 0.1 μm to 3 μm;

23. the method for producing a niobium for capacitors as described in 16 above, wherein the substance mainly comprising niobium is a niobium granulated product having an average particle size of 10 μm to 300 μm;

24. the method for producing a niobium for capacitors as described in 16 above, wherein the substance mainly comprising niobium is a niobium sintered body having a BET specific surface area of 0.5 m²/g to 7 m²/g;

25. a method for producing a niobium granulated product for capacitors, which is characterized in granulating the niobium powder for capacitors described in 5 above;

26. a method for producing a niobium sintered body for capacitors, which is characterized in sintering the niobium granulated product for capacitors described in 6 above;

27. a niobium for capacitors obtained by the method described in any one of 16 to 22 above;

28. a niobium granulated product for capacitors obtained by the method described in 25 above;

29. a niobium sintered body for capacitors obtained by the method described in 26 above;

30. a method for producing a capacitor constructed by one electrode mainly comprising niobium, the other electrode and a dielectric material interposed between the two electrodes, which is characterized in comprising a step of reducing the chromium content in the electrode mainly comprising niobium in the production process of the capacitor;

31. a method for producing a capacitor constructed by one electrode formed of a niobium sintered body mainly comprising niobium, the other electrode and a dielectric material interposed between the two electrodes, which is characterized in comprising the method for producing a niobium for capacitors described in at least one of 16 to 22 above as a production process;

32. a method for producing a capacitor constructed by one electrode formed of a niobium sintered body mainly comprising niobium, the other electrode and a dielectric material interposed between the two electrodes, which is characterized in comprising the method for producing a niobium granulated product for capacitors described in 25 above as a production process;

33. a method for producing a capacitor constructed by one electrode formed of a niobium sintered body mainly comprising niobium, the other electrode and a dielectric material interposed between the two electrodes, which is characterized in comprising the method for producing a niobium sintered body for capacitors described in 26 above as a production process;

34. a method for producing the capacitor described in 10 above, wherein the niobium oxide is formed by electrolytic oxidation;

35. a capacitor obtained by the production method described in any one of 30 to 33 above;

36. an electronic circuit using the capacitor described in any one of 8 to 15 and 35 above;

37. an electronic instrument using the capacitor described in any one of 8 to 15 and 35 above;

38. The niobium for capacitors as described in 1 above, wherein the chromium content is 40 ppm by mass or less;

39. The niobium for capacitors as described in 1 above, wherein the chromium content is 5 ppm by mass or less; and 40. The niobium for capacitors as described in 1 above, wherein the chromium content is 3 ppm by mass or less.

MODE FOR CARRYING OUT THE INVENTION

One embodiment for obtaining the niobium for capacitors of the present invention is described below based on one of the embodiment examples.

The niobium for capacitors of the present invention is a substance which mainly comprises niobium and can be used as a material for producing a capacitor. In this embodiment, a powder, a granulated product and a sintered body are included.

A niobium powder as the raw material of the niobium for capacitors can be obtained, for example, by reducing niobium halide with hydrogen, magnesium or sodium, reducing potassium niobium fluoride with sodium, electrolyzing potassium niobium fluoride with a molten salt (NaCl+KCl) on a: nickel cathode, or introducing hydrogen into a metal niobium ingot and then pulverizing the product. The niobium powder obtained by these methods is considered to contain impurities from niobium raw material, reducing agent and the environment of the instrument used.

Chromium in the niobium is probably intermingled as an impurity through such a route. The niobium powder, the niobium granulated product and the niobium sintered body of the present invention can be obtained by reducing the chromium content in a niobium powder, a niobium granulated product and a niobium sintered body to 50 ppm by mass or less, preferably 40 ppm by mass or less, more preferably 5 ppm by mass or less and much more preferably 3 ppm by mass or less.

For obtaining a niobium having a small chromium content, a method of using a raw material having a sufficiently small chromium content and using a particular niobium production apparatus designed to prevent intermingling of even a slight amount of chromium, and a method of providing a step of removing chromium intermingled on the way of the process of producing the niobium, may be used. Insofar as the chromium content can be reduced to 50 ppm by mass or less, any method can be applied to the present invention without particular limitation.

Examples thereof include a method of using a niobium raw material or a reducing agent each having a higher purity and preventing the intermingling of chromium by using an instrument free of chromium, and a method of washing the above-described niobium powder by using an acid containing at least one acid of a hydrofluoric acid, a nitric acid, a sulfuric acid and a hydrochloric acid, and an alkali, or by using the above-described acid, an alkali and a hydrogen peroxide in sequence or in combination.

Preferred is the latter method using an acid and a hydrogen peroxide. This method can be applied also to a niobium adjusted to have a composition as the niobium for capacitors (namely, a niobium containing niobium nitride, which is described later) or a niobium having adjusted in a shape (namely, a powder, a granulated product or a sintered body). Since this method can be used in a relatively later step during the production of a niobium for capacitors, it is not necessary in many preceding steps to use raw materials or apparatuses particularly designed to prevent the intermingling of chromium.

The niobium powder of the present invention preferably has an average particle size of 3 μm or less so as to increase the specific surface area of the powder, because the capacitance of a capacitor produced using the niobium powder is in a proportional relation with the specific surface area of the powder. In this regard, it is effective for elevating the capacitance of a capacitor to [more] increase the surface area, that is, to reduce the average particle size. However, if the particle size is too small, the impregnation of cathode agent in the later step becomes difficult. On taking account of the balance therebetween, the average particle size of the niobium powder is preferably from 0.1 μm to 3 μm. The average particle size of the niobium granulated product is preferably from 10 μm to 300 μm.

The niobium granulated product of the present invention can be obtained, for example, by granulating the niobium powder to an appropriate size. For the granulation, a conventionally known method can be employed. Examples thereof include a method where powder particles are left standing at a high temperature of 500° C. to 2,000° C. in a vacuum and then wet or dry cracked, a method where powder particles are mixed with an appropriate binder such as acrylic resin or polyvinyl alcohol and then cracked, and a method where powder particles are mixed with an acrylic resin or an appropriate compound such as camphor, phosphoric acid or boric acid, left standing at a high temperature in a vacuum and then wet or dry cracked. The particle size of the niobium granulated product can be freely changed by the degree of granulation and cracking, however, a niobium granulated product having an average particle size of 10 μm to 300 μm is usually used. The niobium granulated product for use may be classified after the granulation and cracking. Also, the niobium granulated product after the granulation may be mixed with an appropriate amount of powder particles before the granulation and used (in the present invention, a granulated product [having] mixed therewith non-granulated powder particles is also referred to as "a granulated product"). Or niobium granulated products having different average particle sizes in an appropriate amount may be mixed to use. The specific surface area of the thus-produced niobium granulated product can be freely changed, and a niobium granulated product having the specific surface area from 0.5 m$^2$/g to 7 m$^2$/g is usually used.

In the niobium powder of the present invention, a part of niobium may be bonded with at least one of nitrogen, carbon and boron so as to improve the leakage current characteristics. The niobium powder may comprise any of niobium nitride, niobium carbide and niobium boride, which are the compounds of nitrogen, carbon and boron, respectively, or may comprise a combination of two or three of these compounds. The sum total of their bonded amounts, that is, the total content of nitrogen, carbon and boron varies depending on the shape of the niobium powder and, in the case of a powder having an average particle size of approximately from 0.1 μm to 3 μm, the total content is from 50 to 200,000 ppm by mass, preferably from 300 to 20,000 ppm by mass. If the total content is less than 50 ppm by mass, the improvement of the leakage current characteristics is not enough, whereas if it exceeds 200,000 ppm by mass, the capacitance characteristics are deteriorated.

The nitridation for forming a niobium nitride may be performed by any one of liquid nitridation, ion nitridation and gas nitridation or by a combination of these methods. Among these, gas nitridation in a nitrogen gas atmosphere is preferred because this treatment is simple and easy. The gas nitridation in a nitrogen gas atmosphere can be performed by allowing the niobium powder to stand in a nitrogen gas atmosphere. By the nitridation at an atmosphere temperature of 2,000° C. or less for a standing time of several hours or less, a niobium powder having an objective nitrided amount can be obtained. As the treatment is performed at a higher temperature, the nitridation can be completed within a shorter time. As such, the nitrided amount can be managed by controlling the nitridation temperature and the nitridation time.

The carbonization for forming a niobium carbide may also be performed by any one of gas carbonization, solid-phase carbonization and liquid carbonization or by a combination of these methods. For example, the carbonization can be performed by allowing a niobium powder to stand together with a carbon material or an organic material containing carbon, such as methane, at 2,000° C. or less under reduced pressure for several minutes to tens of hours.

The boronization for forming a niobium boride may be performed by either gas boronization or solid-phase boronization. The boronization can be performed, for example, by allowing a niobium powder to stand together with boron pellet or a boron source such as boron halide (e.g., trifluoroboron) at 2,000° C. or less under reduced pressure for several minutes to tens of hours.

The niobium sintered body for capacitors of the present invention can be produced by sintering the above-described niobium powder or granulated product. One example of the production method therefor is described below, however, the present invention is by no means limited to this example.

The sintered body may be obtained, for example, by press-molding the niobium powder into a predetermined shape and then heating it at 500° C. to 2,000° C. for several minutes to several hours under a reduced pressure of 10$^{-4}$ Pa to 10$^2$ Pa or in an inert gas such as Ar.

It is also possible to prepare a lead wire comprising a valve-acting metal such as niobium or tantalum and having an appropriate shape and an appropriate length and integrally mold the lead wire at the press-molding of the niobium powder such that a part of the lead wire is inserted into the inside of the molded article, thereby designing the lead wire to work out to a leading line of the sintered body. The specific surface area of the thus-produced niobium sintered body of the present invention can be freely changed, and a niobium sintered body having a specific surface area of 0.5 m$^2$/g to 7 m$^2$/g is usually used.

Using the thus-produced sintered body as one electrode, a capacitor can be manufactured by interposing a dielectric material between this electrode and the other electrode. Examples of the dielectric material of the capacitor include a dielectric material comprising niobium oxide. The dielectric material comprising niobium oxide can be obtained, for example, by chemically forming the niobium sintered body as one electrode in an electrolytic solution. For chemically forming the niobium electrode in an electrolytic solution, an aqueous protonic acid solution is generally used, such as an aqueous 0.1% phosphoric acid solution or an aqueous sulfuric acid solution. In the case of obtaining the dielectric material comprising niobium oxide by chemically forming the niobium electrode in an electrolytic solution, the capacitor of the present invention is an electrolytic capacitor and the niobium side serves as an anode.

On the other hand, in the capacitor of the present invention, the other electrode is not particularly limited and for example, at least one compound selected from electrolytic solutions, organic semiconductors and inorganic semiconductors known in the art of aluminum electrolytic capacitor, may be used.

Specific examples of the electrolytic solution include a dimethylformamide-ethylene glycol mixed solution having dissolved therein 5% by mass of an isobutyl-tripropylammonium tetrafluoroborate electrolyte, and a propylene carbonate-ethylene glycol mixed solution having dissolved therein 7% by mass of tetraethylammonium tetrafluoroborate electrolyte.

When the organic or inorganic semiconductor used has an electrical conductivity of 10$^{-2}$ S·cm$^{-1}$ to 10$^3$ S·cm$^{-1}$, the produced capacitor can have a smaller impedance value and this is preferred. Specific examples of the organic semiconductor which can give such characteristics include an organic semiconductor comprising a benzenepyrroline tetramer and chloranile, an organic semiconductor mainly comprising tetrathiotetracene, an organic semiconductor mainly comprising tetracyanoquinodimethane, and an organic semiconductor mainly comprising an electrically conducting polymer obtained by doping a dopant into a polymer comprising a repeating unit represented by following formula (1) or (2):

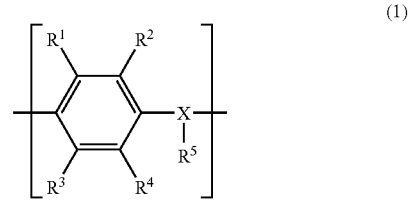

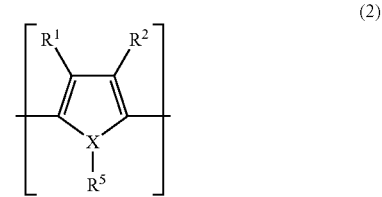

Wherein R$_1$ to R$_4$ each independently represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group., a primary, secondary or tertiary amino group, a $CF_3$ group, a phenyl group and a substituted phenyl group; the hydrocarbon chains in each of the pairs $R_1$ and $R_2$, and $R_3$ and $R_4$ may combine at an arbitrary position to form a divalent chain for forming at least one 3-, 4-, 5-, 6- or 7-membered saturated or unsaturated hydrocarbon cyclic structure together with the carbon atoms substituted by $R_1$ and $R_2$ or by $R_3$ and $R_4$; the cyclic bonded chain may contain a bond of carbonyl, ether, ester, amide, sulfide, sulfinyl, sulfonyl or imino at an arbitrary position; X represents an oxygen atom, a sulfur atom or a nitrogen atoms $R_5$ is present only when X is a nitrogen atom and independently represents hydrogen or a linear or branched, saturated or unsaturated alkyl group having from 1 to 10 carbon atoms.

In the present invention, $R_1$ to $R_4$ of formula (1) or (2) each independently preferably represents a hydrogen atom or a linear or branched, saturated or unsaturated alkyl or alkoxy group having from 1 to 6 carbon atoms, and each of the pairs $R_1$ and $R_2$, and $R_3$ and $R_4$ may combine with each other to form a ring.

In the present invention, the electrically conducting polymer comprising a repeating unit represented by formula (1) is preferably an electrically conducting polymer comprising a structure unit represented by the following formula (3) as a repeating unit:

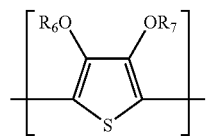

(3)

wherein $R_6$ and $R_7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements resulting from the alkyl groups combining with each other at an arbitrary position; and the cyclic structure includes a structure having a vinylene bond which may be substituted, and a phenylene structure which may be substituted.

The electrically conducting polymer containing such a chemical structure has a polaron or bipolaron within the molecule and therefore, is electrically charged. This polymer is doped with a dopant and for the dopant, known dopants can be used without limitation.

Specific examples of the inorganic semiconductor include an inorganic semiconductor mainly comprising lead dioxide or manganese dioxide, and an inorganic semiconductor comprising triiron tetraoxide. These semiconductors may be used individually or in combination of two or more thereof.

In the case where the other electrode is solid, an electrical conducting layer may be provided thereon so as to attain good electrical contact with an exterior leading line (for example, a lead frame).

The electrical conducting layer can be formed, for example, by the solidification of an electrically conducting paste, plating, vapor deposition of a metal, or formation of a heat-resistant electrically conducting resin film. Preferred examples of the electrically conducting paste include silver paste, copper paste, aluminum paste, carbon paste and nickel paste, and these may be used individually or in combination of two or more thereof. In the case of using two or more kinds of pastes, the pastes may be mixed or may be superposed one on another as separate layers. The electrically conducting paste applied is then solidified by allowing it to stand in air or by heating. Examples of the plating include nickel plating, copper plating, silver plating and aluminum plating. Examples of the metal vapor-deposited include aluminum, nickel, copper and silver.

More specifically, for example, carbon paste and silver paste are stacked in this order on the other electrode and these are sealed with a material such as epoxy resin, thereby constructing a capacitor. This capacitor may have a niobium or tantalum lead which is sintered and molded integrally with the niobium sintered body or welded afterward.

In the case where the other electrode is liquid, the capacitor constructed by the above-described two electrodes and the dielectric material is housed, for example, in a can electrically connected to the other electrode to form a capacitor. In this case, the electrode side of the niobium sintered body is guided outside through the niobium or tantalum lead and at the same time, insulated from the can using an insulating rubber or the like.

The capacitor having such a construction of the present invention is jacketed using, for example, resin mold, resin case, metallic jacket case, dipping of resin or laminate film, and then used as a capacitor product for various uses.

When the capacitor of the present invention is used, a more compact capacitor product can be obtained as compared with conventional capacitors having the same voltage resistance and the same capacitance.

In the electronic circuit of portable telephone, personal computer and the like, many capacitors are used and when the capacitor of the present invention is used, the electronic circuit can be housed in a smaller space than in the case of using conventional capacitors. In addition, by using the capacitor of the present invention, an electronic instrument more compact than conventional ones can be obtained.

MODE FOR CARRYING OUT THE INVENTION

The present invention is described in greater detail below by referring to Examples and Comparative Examples.

The nitrogen content of niobium powder was determined using a nitrogen/oxygen analyzer manufactured by LECO and the Cr content was measured by IPC-MS in each Example and Comparative Example.

The voltage resistance value of the produced capacitor was designated as a voltage value when a voltage was applied to 30 units of capacitors in each Test Example while elevating in sequence by 1 V and the number of short-circuited capacitors exceeded 5 units.

EXAMPLES 1 to 7 AND COMPARATIVE EXAMPLE

A niobium powder (average particle size: 3 μm) obtained by introducing a hydrogen gas into a niobium ingot and wet-cracking the ingot was pulverized in a jet mill in a nitrogen atmosphere without passing through dehydrogenation. The pulverized niobium powder was not taken out outside but left standing at first at 400° C. under reduced pressure for dehydrogenation, further left standing at 850° C. and then cracked to produce a niobium powder. Subsequently, a nitrogen gas was passed therethrough at 300° C.

for 20 minutes to obtain 100 g of a partially (about 1,600 ppm by mass) nitrided niobium powder.

10 g of niobium powder at this stage was used for Comparative Example and the remaining 90 g was dipped in a 3:2 mixed solution of nitric acid and aqueous hydrogen peroxide and stirred at room temperature. About 10 g of niobium powder was extracted every one-hour stirring and the niobium powder in each portion was washed with pure water until the pH of the washing water reached 7 and then dried in a vacuum to obtain 10 g of niobium powder for each of Examples 1 to 7. The average particle size and the Cr content of each niobium powder are shown in Table 1.

TABLE 1

|  | Average Particle Size of Niobium Powder, μm | Cr Content, mass ppm |
| --- | --- | --- |
| Comparative Example | 0.9 | 65 |
| Example 1 | 0.8 | 49 |
| Example 2 | 0.8 | 35 |
| Example 3 | 1.0 | 19 |
| Example 4 | 0.9 | 8 |
| Example 5 | 1.0 | 5 |
| Example 6 | 0.9 | 0.8 |
| Example 7 | 0.9 | 0.5 |

Subsequently, using the niobium powder of each Example, 30 units of molded articles having a size of 1.8 mm×3.5 mm×4.5 mm were produced. At this time, a niobium wire having a diameter of 0.3 mm was integrally molded to work out to a lead. These molded articles were sintered at 1,250° C. in a vacuum of $7\times10^{-3}$ Pa to obtain sintered bodies. Each sintered body was electrochemically formed in an aqueous 0.1% phosphoric acid solution at a temperature of 80° C. and 12 V to form a dielectric layer comprising niobium oxide. Thereafter, polypyrrole (using ammonium persulfate as an oxidant and sodium anthraquinone-sulfonate as a dopant, a reaction between pyrrole and the oxidant was repeated in the presence of a dopant) was filled in pores inside the sintered body as material for the other electrode. Furthermore, carbon paste and silver paste were stacked in this order and after mounting on a lead frame, the whole was sealed with an epoxy resin to produce a capacitor.

The sintered bodies in respective Examples all had a specific surface area of 1 m²/g. The capacitance and the voltage resistance of the capacitors produced are shown in Table 2.

TABLE 2

|  | Capacitance μF | Voltage Resistance V | Number of short-circuited capacitors when a voltage at a voltage resistance was applied |
| --- | --- | --- | --- |
| Comparative Example | 800 | 5 | 6 |
| Example 1 | 820 | 6 | 7 |
| Example 2 | 830 | 8 | 25 |
| Example 3 | 800 | 8 | 20 |
| Example 4 | 810 | 8 | 18 |
| Example 5 | 810 | 8 | 16 |
| Example 6 | 830 | 8 | 7 |
| Example 7 | 820 | 8 | 6 |

It is seen from the results of Examples 1 to 7 that as the Cr content in niobium powder becomes less, the capacitor produced from the niobium powder can have better voltage resistance characteristics.

INDUSTRIAL APPLICABILITY

A capacitor having good voltage resistance characteristics can be obtained by using the niobium for capacitors of the present invention which contains small amount of chromium.

The invention claimed is:

1. A capacitor constructed by one electrode formed of a niobium sintered body mainly comprising niobium, the other electrode and a dielectric material interposed between the two electrodes, wherein the sintered body is a sintered body mainly comprising niobium having a chromium content of from 0.8 ppm by mass or less.

2. The capacitor according to claim 1, wherein the niobium contains a niobium nitride.

3. The capacitor according to claim 1, wherein the niobium contains a niobium carbide.

4. The capacitor according to claim 1, wherein the niobium contains a niobium boride.

5. The capacitor according to claim 1, wherein the niobium is a powder having an average particle size of 0.1 μm to 3 μm.

6. The capacitor according to claim 1, wherein the niobium is a niobium-granulated product having an average particle size of 10 μm to 300 μm.

7. A capacitor constructed by one electrode formed of a niobium sintered body mainly comprising niobium, the other electrode and a dielectric material interposed between the two electrodes, wherein the sintered body mainly comprising niobium having a chromium content from 0.8 ppm by mass or less and wherein the niobium sintered body has a BET specific surface area from 0.5 m2/g to 7 m2/g.

8. The capacitor as claimed in claim 1, wherein the main component of the dielectric material constituting the capacitor is a niobium oxide.

9. The capacitor as claimed in claim 1, wherein the other electrode is at least one member selected from the group consisting of an electrolytic solution, an organic semiconductor and an inorganic semiconductor.

10. The capacitor as claimed in claim 9, wherein the organic semiconductor is at least one organic semiconductor selected from the group consisting of an organic semiconductor comprising a benzopyrroline tetramer and chloranile, an organic semiconductor mainly comprising tetrathiotetracene, an organic semiconductor mainly comprising tetracyanoquinodimethane and an organic semiconductor mainly comprising an electrically conducting polymer obtained by doping a dopant into a polymer comprising two or more repeating units represented by the following formula (1) or (2):

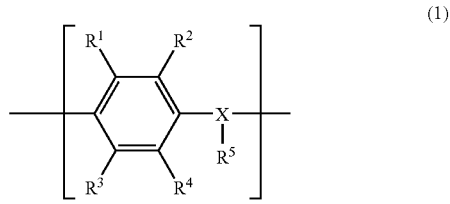

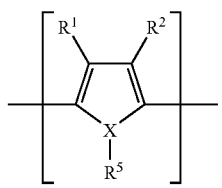

(wherein $R_1$ to $R_4$ each represents a monovalent group selected from the group consisting of a hydrogen atom, a linear or branched, saturated or unsaturated alkyl, alkoxy or alkylester group having from 1 to 10 carbon atoms, a halogen atom, a nitro group, a cyano group, a primary, secondary or tertiary amino group, a $CF_3$ group, a phenyl group and a substituted phenyl group; the hydrocarbon chains in each of the pairs $R_1$ and $R_2$, and $R_3$ and $R_4$ may combine at an arbitrary position to form a divalent chain for forming at least one 3-, 4-, 5-, 6- or 7-membered saturated or unsaturated hydrocarbon cyclic structure together with the carbon atoms substituted by $R_1$ and $R_2$ or by $R_3$ and $R_4$; the cyclic bonded chain may contain a bond of carbonyl, ether, ester, amide, sulfide, sulfinyl, sulfonyl or imino at an arbitrary position; X represents an oxygen atom, a sulfur atom or a nitrogen atom; $R_5$ is present only when X is a nitrogen atom and each $R_5$ independently represents hydrogen or a linear or branched, saturated or unsaturated alkyl group having from 1 to 10 carbon atoms).

11. The capacitor as claimed in claim 10, wherein the electrically conducting polymer is an electrically conducting polymer comprising a repeating unit represented by the following formula (3):

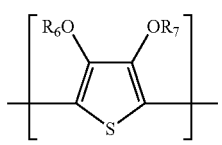

(wherein $R_6$ and $R_7$ each independently represents a hydrogen atom, a linear or branched, saturated or unsaturated alkyl group having from 1 to 6 carbon atoms, or a substituent for forming at least one 5-, 6- or 7-membered saturated hydrocarbon cyclic structure containing two oxygen elements resulting from those alkyl groups combining with each other at an arbitrary position, and the cyclic structure includes a structure having a vinylene bond which may be substituted, and a phenylene structure which may be substituted).

12. The capacitor as claimed in claim 9, wherein the organic semiconductor is at least one member selected from the group consisting of polypyrrole, polythiophene, polyaniline and substitution derivatives thereof.

13. The capacitor as claimed in claim 9, wherein the organic or inorganic semiconductor has an electrical conductivity of $10^{-2}$ S·cm$^{-1}$ to $10^3$ S·cm$^{-1}$.

14. A method for producing the capacitor claimed in claim 8, wherein the niobium oxide is formed by electrolytic oxidation.

15. An electronic circuit using the capacitor claimed in claim 1.

16. An electronic instrument using the capacitor claimed in claim 1.

17. A method for producing a capacitor constructed by one electrode mainly comprising niobium, the other electrode and a dielectric material interposed between the two electrodes, comprising a step of reducing the chromium content in the electrode mainly comprising niobium wherein the chromium content is from 0.8 or less.

18. The method for producing a capacitor according to claim 17, wherein the step of reducing the chromium content is a step of treating a substance mainly comprising niobium with a solution containing at least one acid selected from the group consisting of a hydrofluoric acid, a nitric acid, a sulfuric acid and a hydrochloric acid.

19. The method for producing a capacitor according to claim 17, wherein the niobium contains a niobium nitride.

20. The method for producing a capacitor according to claim 17, wherein the niobium contains a niobium carbide.

21. The method for producing capacitor according to claim 17, wherein the niobium contains a niobium boride.

22. The method for producing capacitor according to claim 17, wherein the niobium is a powder.

23. The method for producing capacitor according to claim 22, wherein the niobium powder has an average particle size of 0.1 μm to 3 μm.

24. The method for producing capacitor according to claim 17, wherein the niobium is a niobium granulated product having an average particle size of 10 μm to 300 μm.

25. The method for producing capacitors according to claim 17, wherein the niobium is a niobium sintered body having a BET specific surface area of 0.5 m$^2$/g to 7 m$^2$/g.

26. A method for producing a capacitor according to claim 17, further comprising granulating the niobium.

27. A method for producing a capacitor according to claim 26, further comprising sintered the granulated niobium.

28. A capacitor obtained by the production method claimed in claim 17.

* * * * *